W. H. KLOCKE.
REAR AXLE HOUSING.
APPLICATION FILED JAN. 3, 1917.
1,252,812.
Patented Jan. 8, 1918.
2 SHEETS—SHEET 1.
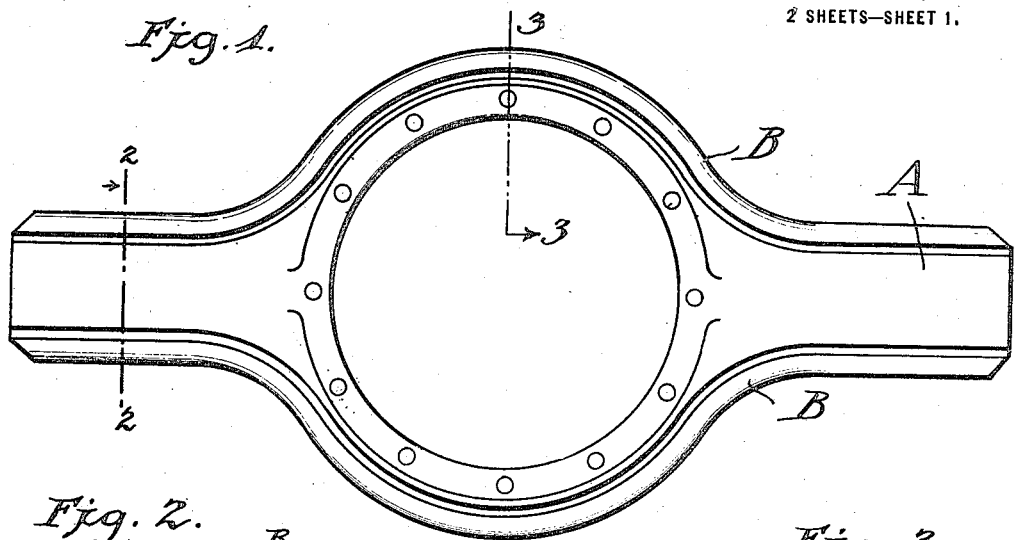
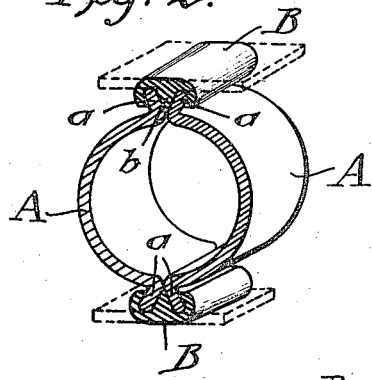
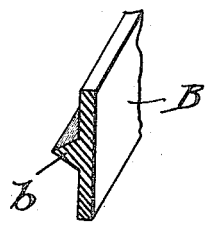
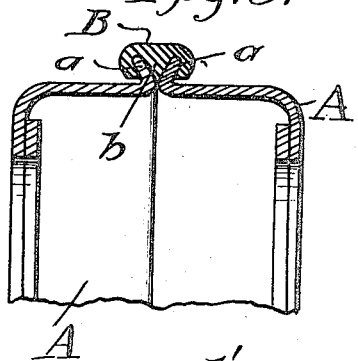
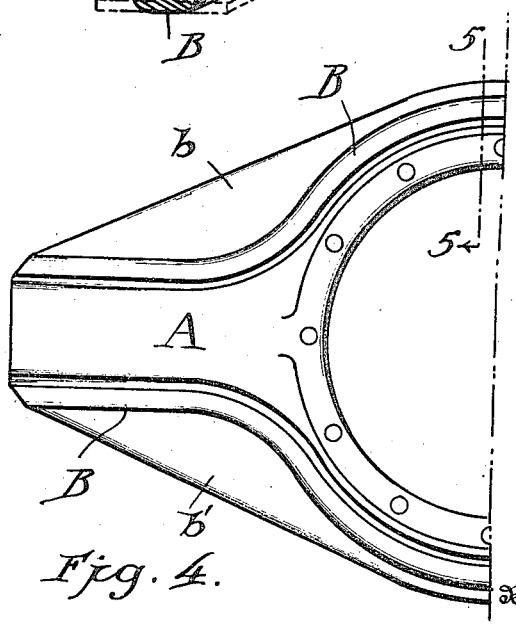
Inventor
William H. Klocke.
By His Attorney
Jas. H. Griffin

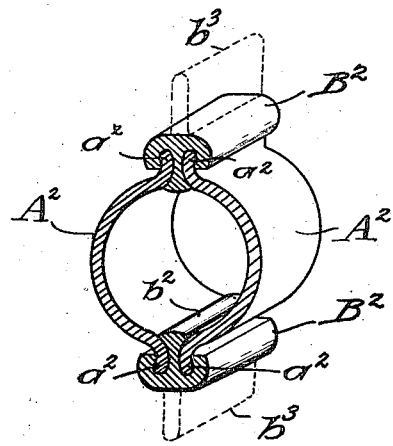
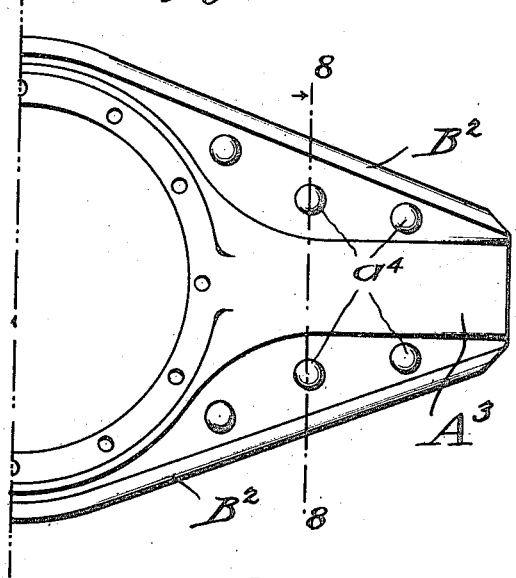
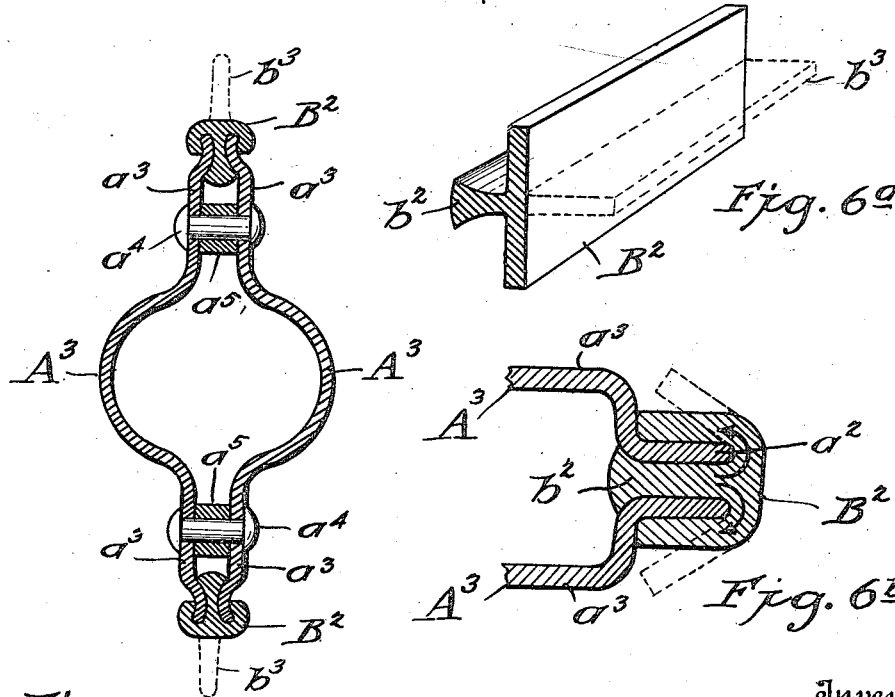
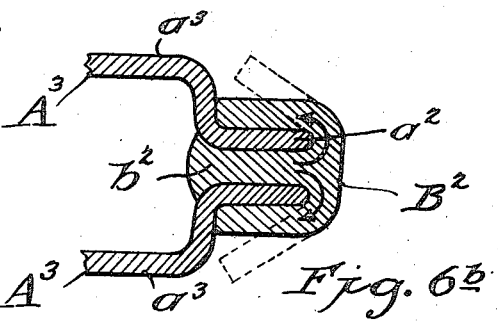

UNITED STATES PATENT OFFICE.

WILLIAM H. KLOCKE, OF WOODHAVEN, NEW YORK.

REAR-AXLE HOUSING.

1,252,812.        Specification of Letters Patent.        Patented Jan. 8, 1918.

Application filed January 3, 1917. Serial No. 140,361.

*To all whom it may concern:*

Be it known that I, WILLIAM H. KLOCKE, a citizen of the United States, residing at Woodhaven, county of Queens, and State of New York, have invented a certain new and useful Rear-Axle Housing, of which the following is a specification.

This invention is an axle housing and, more particularly, a rear axle housing for motor vehicles.

It has been the practice to form rear axle housings in various ways, the most modern of which is the stamping up of the housing in two complementary sections, each of which embodies one-half of the housing, and thereafter securing these sections together by either bending over the edges of one portion of the housing to embrace the edges of the other portion thereof, or by oxyacetylene welding or riveting together the free edges of the said two complementary sections.

In the first of the foregoing methods, that is, the one wherein the edges of one portion of the housing are bent over the edges of the other portion, several practical disadvantages are inherent, chief among which is the difficulty in the assembling of the parts to make the seam sufficiently tight to preclude leakage of the lubricant when the housing is used in conjunction with what is known as a "floating axle", or one which is entirely surrounded by a lubricant. This is particularly the case after the housing has been in use for a while, during which use the strain upon the housing serves to work the joint loose, thereby resulting in leakage of the lubricant.

In practising the second method, namely the oxyacetylene welding of the parts together, a firm and substantially homogeneous structure may be obtained if the workmen are sufficiently skilled and if the parts are properly prepared for the welding operation. However, to properly carry out this operation a series of steps are necessary which are expensive and, moreover, the operation of welding, of itself, is tedious and slow. Accordingly, in order to weld the parts of the housing together as described, very considerable time, material and skill must be expended, thereby greatly adding to the cost of manufacture and making it necessary to sell such housings at a comparatively high price. Furthermore, it is well recognized that the efficiency of a welded joint is considerably below the maximum strength of the metal and, accordingly, a housing of maximum strength cannot be obtained in this manner. The disadvantages incident to riveting the complementary sections together, as well as the attendant expense, are so well understood that comment thereon is unnecessary.

With the foregoing, and other disadvantages of present methods in mind, the objects of this invention are to efficiently, economically and expeditiously unite the component parts of a rear axle housing by means which may be readily and speedily applied and which will possess, when in position upon a housing, far greater strength than has heretofore been attained. A further object of the invention is to so form and organize this means that when in position to lock the parts in assembeld relation tight joints are provided and leakage at the rear axle is absolutely precluded.

Features of the invention, other than those specified, will be apparent from the following description when read in conjunction with the accompanying drawings.

In the accompanying drawings, I have illustrated different practical embodiments of the invention, but the constructions therein shown are to be understood as illustrative only, and not as defining the limits of the invention.

Figure 1 is a rear elevation of a rear axle housing embodying the present invention.

Fig. 1ª is a section showing the preferred form of seam locking strip.

Figs. 2 and 3 are sections taken on the lines 2—2 and 3—3, respectively, of Fig. 1.

Fig. 4 is a view similar to that of Fig. 1, but showing only one-half of a housing constructed in accordance with a modified form of the invention.

Fig. 5 is a section on line 5—5 of Fig. 4.

Fig. 6 is a section similar to that of Fig. 2 but taken through a housing constructed in accordance with a further modified form of the invention.

Fig. 6ª is a modified form of seam locking strip.

Fig. 6ᵇ shows the manner of applying the locking strip of Fig. 6ª.

Fig. 7 is a view similar to that of Fig. 4 but showing a further modification, and Fig. 8 is a section on the line 8—8 of Fig. 7.

Referring to the drawings, and more particularly to Figs. 1 to 3 inclusive, the axle housing is made in two parts or sections A and A so that, when the two parts are positioned together in face abutting relation, each part will constitute substantially one-half of the housing, said housing being parted longitudinally as shown. A housing in the manner described, may be of any conventional shape, the shape shown in the drawings being for purposes of illustration only.

The sections A A are preferably stamped up from sheet metal, and each half is provided along its lateral edges with a flange $a$, so that, when the two halves are assembled, the flanges $a$ of said halves, at the top and bottom of the housing, respectively, extend in substantially parallel relation throughout the length of the housing.

In the form of the invention shown in Figs. 1 to 3, the flanges $a$ of the two parts do not engage one another in face abutting relation, but are bent apart, as shown in Figs. 2 and 3, so that while they may contact at their bases they diverge outwardly. This is to allow of their proper coöperation with the particular form of seam lock B, which I prefer to employ, and which will now be described. Seam lock B is preferably in the form, initially, of an elongated strip of malleable metal, having a cross-section of the general form shown in Fig. 1$^a$. The strip, for economical purposes, is preferably rolled, and embodies, in the main, a flat strip centrally, on one side of which is a projecting rib or bead $b$, in this embodiment of the invention, converging toward its free edge.

In assembling the parts in the form shown in Figs. 1 to 3, two strips B are taken, which strips are first preferably formed into the longitudinal contour of the free edges of the flanges $a$ at the top and bottom of the housing. When this has been accomplished, the two halves A of the housing are positioned in face abutting relation and the strips B are positioned along the free edges of the flanges as shown in dotted lines in Fig. 2, the converging ribs $b$ of said strip occupying the complementary shaped channels between the diverging flanges $a$. The next operation and the one which completes the structure consists in the bending of the two lateral halves of each strip B over the ends of the free edges of the flanges $a$ and into face abutting relation with the exterior faces of said flanges. The result of this manipulation is clearly shown in Figs. 2 and 3.

It will be observed that the locking of the flanges together in the manner specified, securely unites the contiguous edges of the two halves of the housing and, because of the fact that the two lateral halves of each strip B are bent over the diverging flanges $a$, it will be manifest that creeping or loosening of said strip is entirely precluded. An attempt to work the strip B off of the flanges $a$ will only serve to tighten the grip which said strip has upon said flanges, this being due to the wedging cross-section between the parts. The necessity of oxyacetylene welding is entirely obviated and, as a perfectly tight joint is assured at all times, leakage of the lubricant through said joint cannot occur.

In the construction of Figs. 1 and 3, the housing is shown in one of its general conventional forms wherein it embodies the complementary stamped up walls provided at their edges with just sufficient flange to allow of the gripping engagement with the seam locking strips. However, it is frequently the case in the manufacture of axle housings of this general character, that a stiffening web or deep flange is provided along the top and bottom edges of the housing parts so as to shape the housing in the form of a truss to enable the same to stand greater strains and to strengthen the construction generally. The present invention is not restricted to the one form of Figs. 1 to 3, but may be so organized as to embody this flange or web truss construction. One manner of accomplishing this result is illustrated in Figs. 4 and 5, while still another manner of accomplishing the same end is illustrated in remaining figures of the drawings.

In the construction of Figs. 4 and 5, the web, to form the housing into truss shape, is embodied in the strips B' which corresponds to the strips B. In this construction the web is in the form of a flange $b'$ rolled integral with the strip B' so that said web is attached to the two halves of the housing by the operation of attaching the strip thereto. The web $b'$ may vary in depth throughout its length to impart the desired esthetic appearance to the structure or may, if desired, be of a constant thickness throughout its length. Aside from the addition of the flange or web $b'$, the locking strip B' is the same as the strip B hereinbefore described, and is applied in the same manner to the two halves of the housing constructed identically as in the described form of the invention.

In Figs. 6 and 6$^a$, a modified form of the invention is illustrated. In this construction the two halves A$^2$ of the housing are formed in substantially the same way as shown in Fig. 1, being provided at their edges with flanges $a^2$ but, in contradistinction to the construction of Fig. 1, said flanges do not diverge outwardly but are either substantially parallel or slightly convergent toward their free edges. The locking strip which is adapted to coöperate with the housing halves thus formed is designated B$^2$, and is shown in detail in Fig. 6$^a$. It embodies, generally speaking, the flat main strip centrally and with one side of which is formed a flange $b^2$, positioned similarly to the rib $b$ but of a different shape, in that it is preferably longer and flares or tapers toward its free edge.

In assembling the parts of this modified construction, substantially the same procedure is carried out as hereinbefore described with the exception that the flange $b^2$ is positioned intermediate the flanges $a^2$ of the housing halves, so that its opposite faces are in face engagement with the inner faces of said flanges $a^2$. The lateral edges of the strip $b^2$ are bent over the flanges $a^2$, in the position shown in Fig. 6, to securely and tightly bind the edges of the housing halves together.

This method of binding the edges of said halves together, results in a remarkably strong, rigid and impervious joint, as the particular manipulation of the metal during the applying operation is such as to bring the parts into the most tight wedging engagement. It will be noted from the detailed view of Fig. 6$^b$ that when the lateral halves of the strip are wiped over the flanges $a^2$ that the lines of force occasioned by such operation, would be as shown by the arrows on said figure. In other words, as the edges of the strip $B^2$ are bent over the free edges of the flanges $a^2$, the tendency of this operation would be to withdraw the flanges $b^2$ from between the flanges $a^2$ and this sets up the wedging action so that when the bent-over portions of the strip $B^2$ are finally in a position to grip the flanges $a^2$, there will be a tight wedging engagement between the parts which will effectively preclude leakage, working loose of the parts or creeping of the strip.

If desired, the web feature described in conjunction with the embodiment of Figs. 4 and 5 of the drawings may be incorporated in the construction now under consideration by simply adding an outer flange or web $b^3$ to the strip $B^2$, as shown in Fig. 6$^a$.

Instead of forming webs or flanges directly upon the locking strips as hereinbefore described for the purpose of imparting the truss features to the housing, this truss feature may be embodied in the metal plates from which the halves of the housing are initially stamped up, and such construction is shown in Figs. 7 and 8 of the drawings.

In applying the present invention to this form of housing, the housing halves $a^3$ are constructed in the usual way with relatively deep webs at their edges. These webs are riveted together as shown for strengthening purposes and to preclude buckling by rivets $a^4$ and the seam, locking strips of the present invention are applied to the free edges of said housing. Either the form of seam locking strip of Figs. 1 to 3, or that of Fig. 6$^b$, may be employed, but for purposes of illustration I have shown the latter form. In employing this arrangement of parts the two halves of the housing are preferably shaped as shown in Fig. 8, so that the webs $a^3$ will not be in face engagement with one another, but will be maintained apart by suitably spacing means $a^5$ to allow of sufficient room between said webs for the introduction and placement of the enlarged free edge of the flange $b^2$ of the locking strip. However, this spacing of the flanges $a^3$ is not absolutely essential, since they might, if desired, be in face abutting relation for the greater portion of their extent and beaded longitudinally to allow of sufficient space for the reception of the enlarged edge of said flange $b^2$.

It will be understood that the main sections of the housing are stamped up by suitable machinery, whereupon the locking strip is assembled in proper position, and the final operation of securing the parts together performed by dies, thereby enabling the article to be expeditiously and economically manufactured.

Slight modifications or variations in the specific structures described may be made as will be evident to those skilled in the art, without departing from the spirit or substance of the invention.

Having thus fully described the invention, what I claim as new, and desire to secure by Letters Patent, is:

1. In a device of the class described, a longitudinally parted axle housing, flanges along the longitudinal free edges of the parts of said housing, which flanges lie in angular relation to the plane of parting of the housing, and a locking strip provided with a rib adapted to lie between said flanges with the opposite faces of said rib in face engaging relation with the inner faces of the flanges, the lateral edges of said strip being bent over the free edges of the flanges and into face engaging relation with the outer faces of said flanges.

2. A rear axle housing embodying two complementary sections, in combination with locking strips each of which is provided with a rib adapted to lie between one of the free edges of each of the sections, the lateral halves of each strip being bent over the adjacent edges of the sections whereby each free edge of said sections is clamped between the rib of the locking strips and one of the lateral halves of one of said strips.

3. In a device of the class described, an axle housing embodying two complementary sections, and flanges at the lateral edges of said sections, in combination with two members each of which embodies an elongated strip provided at one face with a medial rib extending longitudinally of the strip, said ribs being positioned between the contiguous flanges of the two sections of the housing and the lateral halves of the strips bent over the edges of said flanges and into face abutting relation with the outer faces of said flanges.

4. In a device of the class described, a rear axle housing longitudinally divided into two complementary sections, flanges along the longitudinal free edges of each section of the housing, which flanges extend in angular relation to the plane of division of the housing and a pair of locking strips each provided with a longitudinally extending medial rib adapted to lie between each pair of flanges and so shaped that the opposite faces of each rib will be in substantially face engaging relation with the inner faces of the adjacent flanges, the lateral halves of each strip being bent over the free edges of the flanges and into face engaging relation with the outer faces of said flanges.

5. In a device of the class described, a rear axle housing longitudinally divided into two complementary sections, flanges along the longitudinal free edges of each section of the housing, which flanges extend in non-parallel relation to the plane of division of the housing and a pair of locking strips each provided with a longitudinally extending medial rib adapted to lie between each pair of flanges and so shaped that the opposite faces of each rib will be in substantially face engaging relation with the inner faces of the adjacent flanges, the lateral halves of each strip being bent over the free edges of the flanges and into face engaging relation with the outer faces of said flanges.

6. In a device of the class described, a rear axle housing divided longitudinally into two complementary sections, and flanges along the longitudinal free edges of each of said sections, in combination with a pair of binding strips each of which is provided on one of its faces with a longitudinally extending medial rib of tapered cross-section, said binding strips being positioned along the free edges of the flanges with ribs extending between said flanges, and the lateral halves of the strip bent over the free edges of the flanges and into face engaging relation with the outer faces of the flanges, whereby the faces of the binding strips and their ribs, which are in abutting relation with the faces of the housing sections, are in non-parallel relation to the plane of division of the housing, and a wedging engagement between the parts results.

7. In a device of the class described, a rear axle housing embodying two sections, and flanges along the lateral edges of each section, in combination with two members substantially T-shaped in section, the leg of each of said members being inserted between the flanges at the adjacent complementary lateral edges of the housing sections, and the arms of said T-members being wiped over the free edges of said flanges, and into face abutting relation with the outer faces of the flanges.

8. In a device of the class described, a rear axle housing embodying two complementary sections, in combination with two members, one of which is pressed between and at the juncture of each two complementary longitudinal edges of the sections, each of said members being provided with two lateral extensions each one of which overlaps the longitudinal edge of the housing section adjacent to it.

9. In a device of the class described, a rear axle housing embodying two sections, in combination with two members substantially T-shaped in section, the leg of each of these members being inserted between its adjacent complementary lateral edges of the housing, and each of the arms of said T-members being wiped over the adjacent lateral edge of one of said sections.

10. In a device of the class described, a rear axle housing embodying two complementary sections, in combination with locking strips each of which is provided with a rib adapted to lie between one of the free edges of each of the sections, the lateral halves of each strip being bent over the adjacent edges of the sections whereby each free edge of said sections is clamped between the rib of the locking strips and one of the lateral halves of one of said strips, and a flange formed on the face of each locking strip opposite to the face thereof on which the rib is positioned, said flanges serving to reinforce the housing when the sections thereof are secured together by the locking strips.

11. In a device of the class described, a rear axle housing longitudinally divided into two complementary sections, flanges along the longitudinal free edges of each section of the housing, which flanges extend in non-parallel relation to the plane of division of the housing and a pair of locking strips each provided with a longitudinally extending medial rib adapted to lie between each pair of flanges and so shaped that the opposite faces of each rib will be in substantially face engaging relation with the inner faces of the adjacent flanges, the lateral halves of each strip being bent over the free edges of the flanges and into face engaging relation with the outer faces of said flanges, and a web extending along the outer face of each locking strip for forming the housing into substantially truss shape when the sections of said housing are secured in assembled relation by said strips.

12. In a device of the class described, a rear axle housing embodying two complementary sections, in combination with two members, one of which is pressed between and at the juncture of each two complementary longitudinal edges of the sections, each of said members being provided with two lateral extensions each one of which overlaps the longitudinal edge of the housing section adjacent to it, and a web extending along the outer face of each of said members for forming the housing into substantially truss shape when the parts are in assembled relation.

In testimony whereof I have signed my name to this specification.

WILLIAM H. KLOCKE.

Copies of this patent may be obtained for five cents each, by addressing the "Commissioner of Patents, Washington, D. C."